Sept. 3, 1929.  R. M. SEARLE  1,727,221
MOLD MECHANISM FOR GLASS WORKING MACHINES
Filed June 3, 1927  4 Sheets-Sheet 1

Inventor
Russell M. Searle
By
Lloyd H. Cole
Attorneys

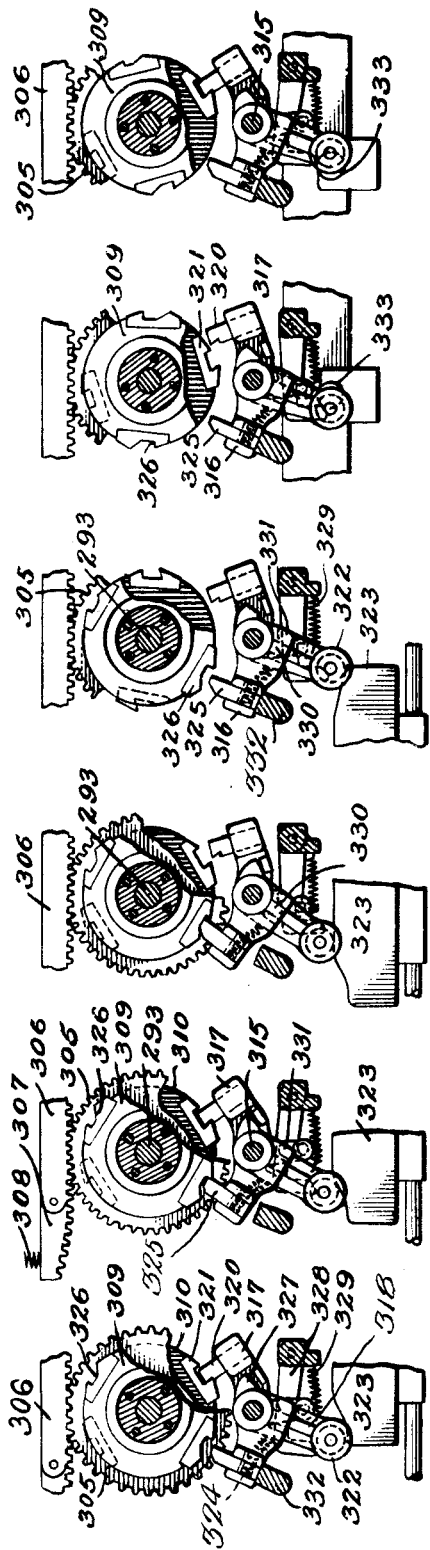
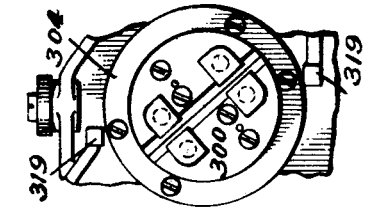
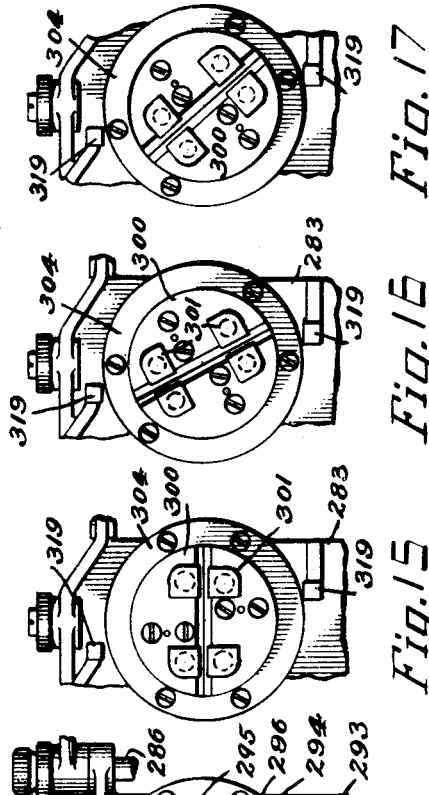
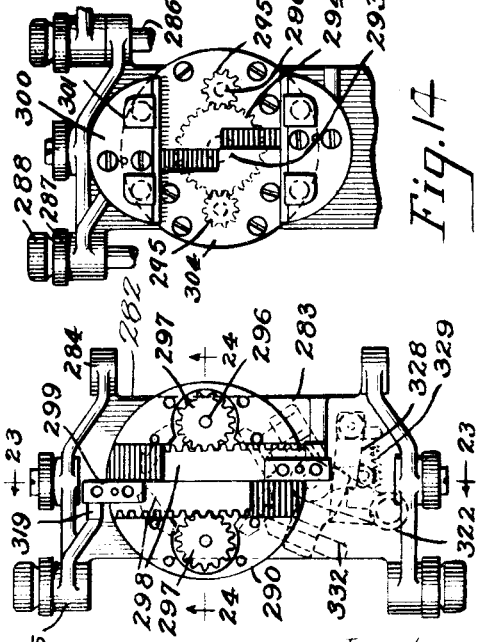

Patented Sept. 3, 1929.

1,727,221

UNITED STATES PATENT OFFICE.

RUSSELL M. SEARLE, OF ALBANY, NEW YORK, ASSIGNOR TO CORNING GLASS WORKS, OF NEW YORK, N. Y., A CORPORATION OF NEW YORK.

MOLD MECHANISM FOR GLASS-WORKING MACHINES.

Application filed June 3, 1927. Serial No. 196,246.

This invention has for its object to provide a novel construction in mold closing mechanisms especially adapted for use in connection with a paste-mold glass blowing machine in which the molds move for a part of their path only in registration with travelling blowing mechanisms, the object being to provide a compact construction by which the molds may be closed, rotated, opened and held open in such a position as to permit the removable blown articles away from the mold by a continued movement of the articles in the line of their blowing motion and for these purposes it consists of the several parts and their assemblage as hereinafter set forth.

Referring to the accompanying drawings, in which corresponding parts are designated by corresponding marks of reference:

Figures 1 and 2 together illustrate a side elevational view of a complete machine for use in connection with which the molding actuating mechanisms herein claimed have been designed.

Figs. 3-6 are detail views of a mold carrier unit embodying my invention, Fig. 3 being an end elevation, Fig. 4 a side elevation, Fig. 5 a transverse vertical section on the line 23—23 of Figs. 4, 6, and 13, and Fig. 6 a longitudinal vertical section on the line 24—24 of Figs. 3, 5, and 13;

Figs. 7-12 are horizontal sectional details of the mold carrier mechanism on the line 25—25 of Fig. 5, just above the latch mechanism, showing the successive positions of the operative cycle;

Figs. 13-17 are horizontal sectional details of the mold carrier mechanism on the line 31—31 of Fig. 4, parts being removed in Fig. 13, showing the opening and closing means and the successive positions of the mold carrier segments.

The molds 280 are mounted on a mold belt 281 which consists of a series of identical articulated mold carrier links 282 and moves in a closed path in a vertical plane, its operative run being the upper one and being beneath the conveyor 150. As the machine here described is one constructed for the manufacture of bulbs for electric lamps, the molds 280 are separable and of the paste mold type and, during the blowing, are rotated around the vertical axis of the mold cavity. This necessitates special mechanism for closing the molds, their rotation during the blowing period, and the arrest of their rotation and opening when they are in a position such that the finished bulbs may be removed from the molds, without injury, by the travel of the glass conveyor. Moreover, in order to reduce the amount of glass formed into the ribbon and not fabricated into the final product, it is important that the adjacent molds be brought as close together as possible. This renders a compact mold mechanism of great importance.

Figure 3:
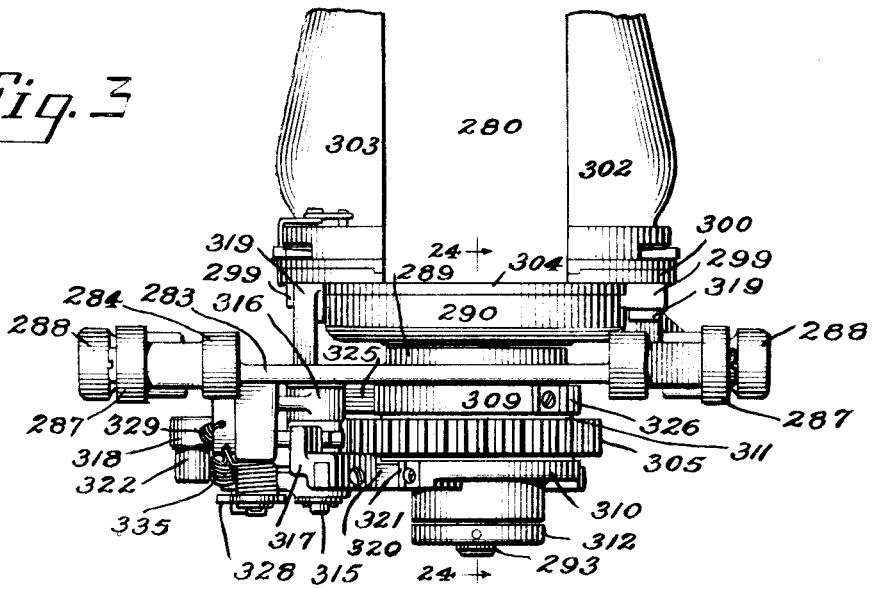

Each of the mold links 282 (Fig. 3) comprises a plate member 283, having at each corner a bearing 284, 285, the bearings at one end being closer together than at the other to permit narrow bearings 284 on one member to slip between wider bearings 285 on an adjacent member, the members being secured together by pins 286 which carry, outside of the bearings, driving rollers 287, and outside of these supporting rollers 288.

Generally speaking, the mold opening, closing and rotating devices involve the mounting of a mold on a rotatable member which has sleeved therein a mold opening and closing shaft, independent uni-directional friction drives from a part actuated by the travel of the mold to the shaft and to the mold carrier, and means for locking either the shaft or the mold carrier against rotation by its friction drive or the release of such for rotation by such drive. When one of the parts is rotated in respect to the other the direction of the relative movement of the two parts will be different from that which results from the rotation of the second part in respect to the first, and this difference of rotation is utilized to cause the reciprocating movement of the mold parts to effect opening and closing.

Rotatably supported in the body portion of the link, by a bearing 289 (Figs. 5 and 6), is the mold carrier body 290, the lower portion of which is stepped, at 291 and 292, and the upper portion of which is recessed. Within body 290 is sleeved a shaft 293, the shaft having fast on its upper end a drive gear 294, which drives two oppositely disposed pinions 295 on pins 296 in the bottom of the recess in the body. The pinions 295 have fast thereon gears 297, each of which meshes with a sliding rack 298, these racks being placed back to back and being guided in their movement by slots in the top of the mold carrier body. Each rack 298 has a lug 299 on which is secured a mold segment 300 that has a pair of mold lock studs 301 to receive the individual mold sections 302 and 303, a slotted cover plate 304 being interposed between the mold segments and the top of the mold carrier, and being fast to the latter. Sleeved on shaft 293, below the lower end of the mold carrier body, is a mold rotating gear 305 which cooperates with a mold carrier rotating rack 306 carried at a proper point along the path of the mold carrying belt. The rack 306 has pivoted to it, on its approach end, a pick-up rack 307 (Fig. 26), which is normally pressed into the path of the gears 305 by a spring 308.

Figure 5:
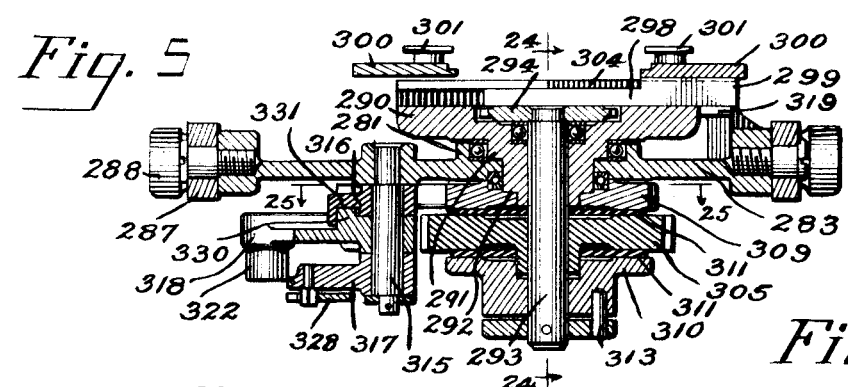
Figure 4:
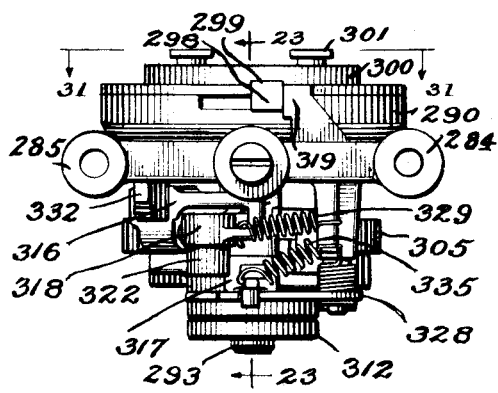
Figure 6:
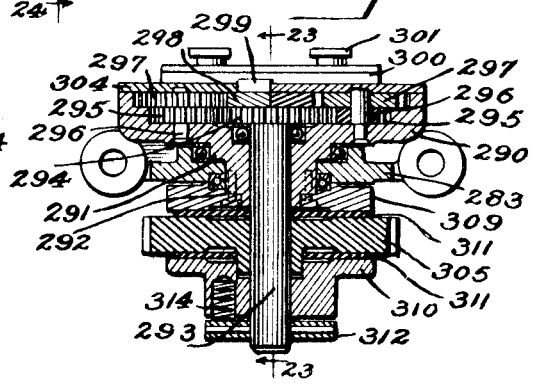

As shown in Figs. 4, 5 and 6, the lower end of each mold carrier body 290 has fast thereon a ratchet disc 309, located above the gear 305, and the shaft 293 has keyed thereon a ratchet disc 310 located below the gear 305, a friction drive disc 311 being interposed between the gear 305 and the disc 309 and between the gear and the disc 310, so that the shaft or the mold carrier, or both, can be rotated around their common axis by the rotation of gear 305, dependent on their locked or unlocked condition. In order to place pressure on the friction discs a collar 312 is fast on the shaft below the ratchet disc 310, to which it is locked by a pin 313, springs 314 being interposed between the two to press the disc upwardly on the shaft.

The operation of opening and closing the molds is dependent upon a relative rotation of the shaft 293 and the mold carrier body 290 under the drive of gear 305, which rotation in turn is dependent on the condition of certain locks shown particularly in Figs. 7–12.

Mounted on a pin 315, projecting from the lower surface of the link body 283, is an upper pawl arm 316 to lock the disc 309 which is fast on the mold carrier body 290, a lower pawl arm 317 to lock the disc 310 which is keyed to the shaft 293, and a cam arm 318 intermediate of the pawl arms and acting as a common drive, with a loose connection, for the two arms.

The normal position of the parts is one in which the mold halves are open to their maximum and the mold carrier body is in such angular position in the link body that the mold halves are on opposite sides of the plane in which the mold carrier moves, the mold carrier body being held in this position against the frictional drive exerted from the gear 305 by the ends of the mold actuating racks 298 contacting with lugs 319 upon the top of the link body 283 (Fig. 13). At this time the molds are held open because a rotation of their actuating gear 294 is prevented by the engagement of a bit 320 carried by the lower pawl arm 317 with a ratchet insert 321 in the lower ratchet disc 310. If, during this position of the parts, the gear 305 is in engagement with the rack 306, the friction drives will slip.

On its outer end cam arm 318 carries a roller 322 by which the arm is rocked when the roller, in the travel of the individual mold mechanism contacts with a mold closing cam 323, which is adjustable longitudinally of the machine. With the parts in the normal position shown in Fig. 7, it will be seen that movement of arm 318 rocks, through a compression spring 324, the upper pawl arm 316, and a bit 325 carried by it moves into engagement with a ratchet insert 326 carried by the plate ratchet disc 309, thus placing the parts in the position shown in Fig. 8, in which the mold carrier body, in addition to the lock against rotation due to the lugs 319, is also locked by the upper pawl arm 316.

As roller 322 rides further onto cam 323, the further rocking of cam arm 318 causes a lug 327 carried thereby to strike the lower pawl arm 317 and rock it until its bit 320 disengages the lower ratchet disc 310 as shown in Fig. 9, the pawl arm being caught in the disengaging position by a spring-controlled latch 328.

During the time required for the transition from the position shown in Fig. 8 to that shown in Fig. 9 the mold rotating gear 305 starts the rotation of pinion ratchet disc 310, thus sliding the racks 298 to start closing mold sections 302 and 303, and breaks the lock at lugs 319. As roller 322 continues to ride on the straight portion of cam 323 the closing of the molds will be completed.

When the roller 322 runs off cam 323 it is returned to its normal position by a spring 329 (Fig. 4) and, by the engagement of a lug 330 on its carrying arm 318 with a lug 331 on the upper pawl arm 316 (Fig. 5), rocks the latter against a stop 332 to disengage it from the ratchet disc 309 (Fig. 10).

Figure 1:
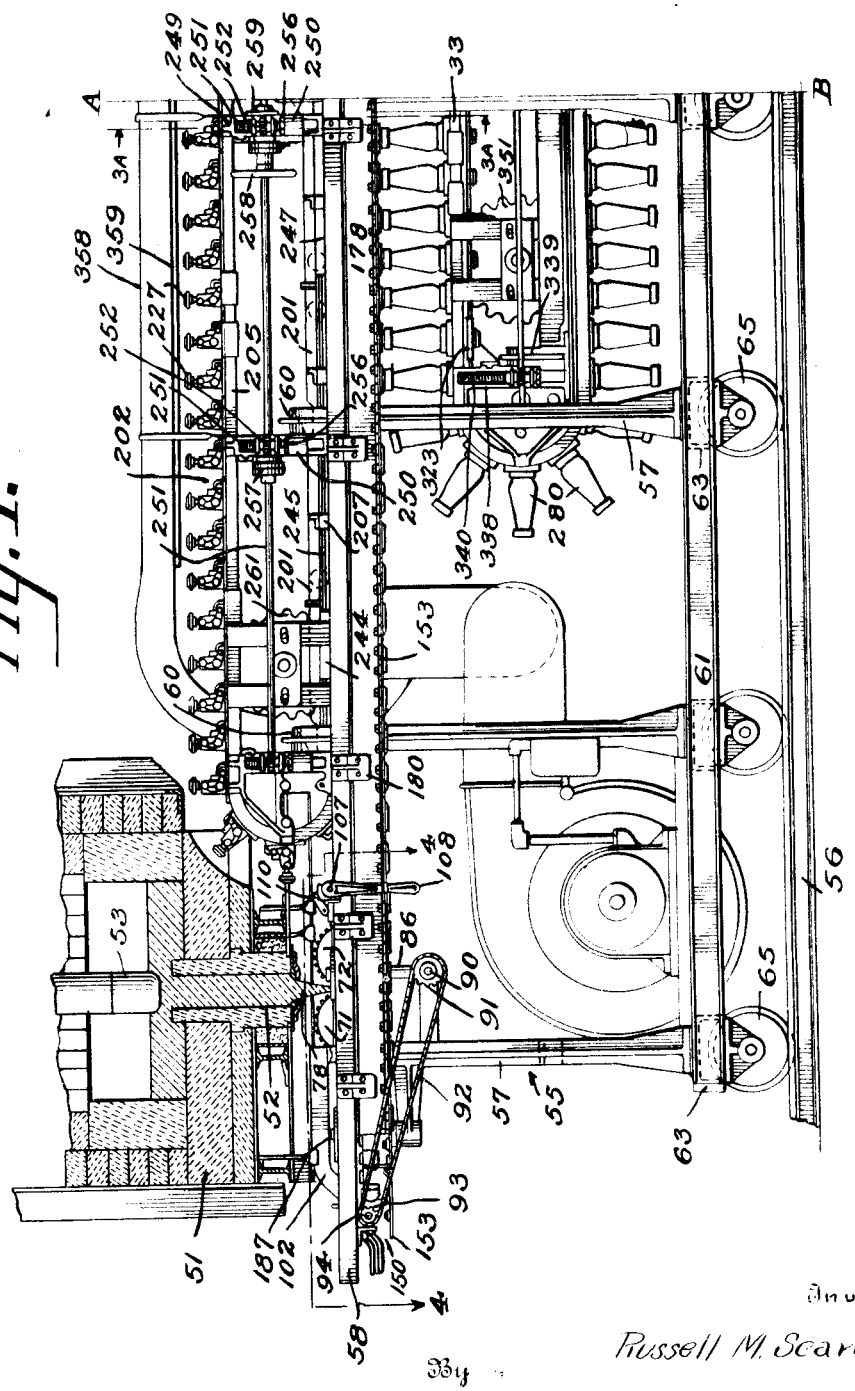
Figure 2:
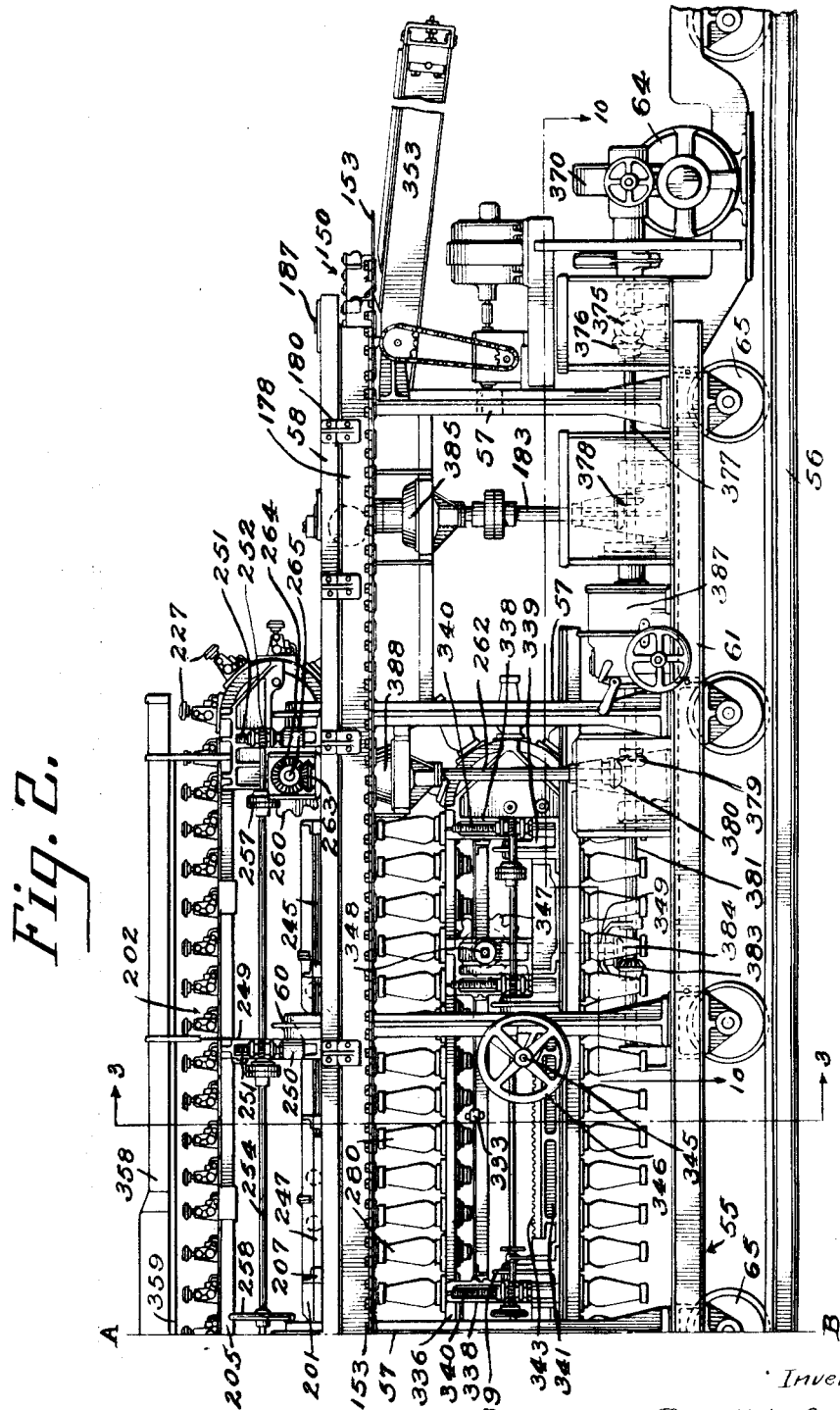

As both locks against rotation of the mold carrier body are now broken; the mold 280 is rotated, by the continued engagement of gear 305 with rack 306, the gear 294 rotating with the mold carrier body. This continues for a suitable period until the mold reaches a predetermined point in its travel, when the latch 328 strikes a mold opening cam 333 (Figs. 2 and 11), adjustably mounted adjacent to the path of the mechanism, and is moved to release the lower pawl arm 317, thus allowing the latter to be rocked by its spring 335 (Fig. 4) to its normal position of engagement with pinion ratchet disc 310, as shown in Fig. 12. This locks pinion ratchet disc 310 but, as plate ratchet 309 is still unlocked, the mold carrier body is now rotated in respect to gear 294. This causes a rotative movement, the reverse of their prior relative movements when the mold carrier body 290 was locked and the shaft 293 free, and the consequent opening of the mold sections 302 and 303, and the movement of the racks outwardly sufficient to enable their ends to contact with lugs 319 on link body member 283, at which time the parts will again be in normal position.

The inserts 326 and 321 are preferably, as shown, duplicated on the ratchet discs 309 and 310 at diametrically opposite points to reduce unnecessary rotation of the parts.

What is claimed is:

1. The combination with a rotating member carrying separable mold parts which rotate therewith, a member rotatable in respect to the first named member, a friction drive for each of said members, locks for holding each of said members against rotation, and means for opening and closing the mold parts by the relative rotation of the members.

2. In a mold mechanism, the combination with a rotating mold carrier, a member carried thereby and rotatable in respect to the mold carrier, means for closing and opening the molds on the relative movement of the carrier and member, an independent friction drive from a common drive for the carrier and member, and a lock for each of the last-named parts.

3. The combination with a rotating mold-carrying member, separable mold parts mounted thereon which rotate therewith, a member carried by the mold-carrying member and rotatable in respect thereto, means for rotating each of said members and holding the other against rotation, means for opening and closing the mold parts by the relative rotation of the members, and means for rotating both members together.

4. The combination with a travelling mold unit, a mold carrier rotatably mounted in said unit and carrying separable molds, a mold parts closing actuator also rotatably mounted in the mold unit, a member mounted on the mold unit and rotated by the travel of such unit, friction drives between said rotating member and the mold carrier and mold actuator, independent locks for the mold carrier and for the mold actuator, and means controlled by the travel of the mold unit actuating said locks.

5. The combination of a travelling mold unit having mounted for independent rotation thereon a mold carrier, a mold actuator and a common driving element for the two, the drive being actuated by the travel of the unit, independent friction drives between the driving element and the mold carrier and the mold actuator, independent locks for the mold actuator and the mold carrier, and means for normally maintaining the actuator with the molds open, means actuated on the travel of the mold unit to release said lock and to engage the lock of the mold carrier, whereby the molds are closed by the rotation of the actuator in respect to the mold carrier and without rotation of the mold, and to then disengage the lock of the mold carrier whereby the molds are rotated in closed position, and to then restore the locking parts to initial position to lock the mold actuator, whereby the molds will be opened by the rotation of the mold carrier in respect to the actuator.

6. The combination of a travelling mold unit having mounted for independent rotation thereon a mold carrier, a mold actuator and a common driving element for the two, the drive being actuated by the travel of the unit, independent friction drives between the driving element and the mold carrier and the mold actuator, independent locks for the mold actuator and the mold carrier, means for normally maintaining the actuator locked with the molds open, means actuated on the travel of the mold unit to release said lock and to engage the lock of the mold carrier, whereby the molds are closed by the rotation of the actuator in respect to the mold carrier and without rotation of the mold, and to then disengage the lock of the mold carrier whereby the molds are rotated in closed position, and to then restore the locking parts to initial position to lock the mold actuator, whereby the molds will be opened by the rotation of the mold carrier in respect to the actuator, and means for arresting the rotation of the mold carrier when the molds are opened and on opposite sides of the line of travel of the mold carrier.

RUSSELL M. SEARLE.